Dec. 7, 1926.
G. H. KERN
1,609,949
METHOD OF PRODUCING MOTION PICTURES
Filed Oct. 19, 1921    2 Sheets-Sheet 1
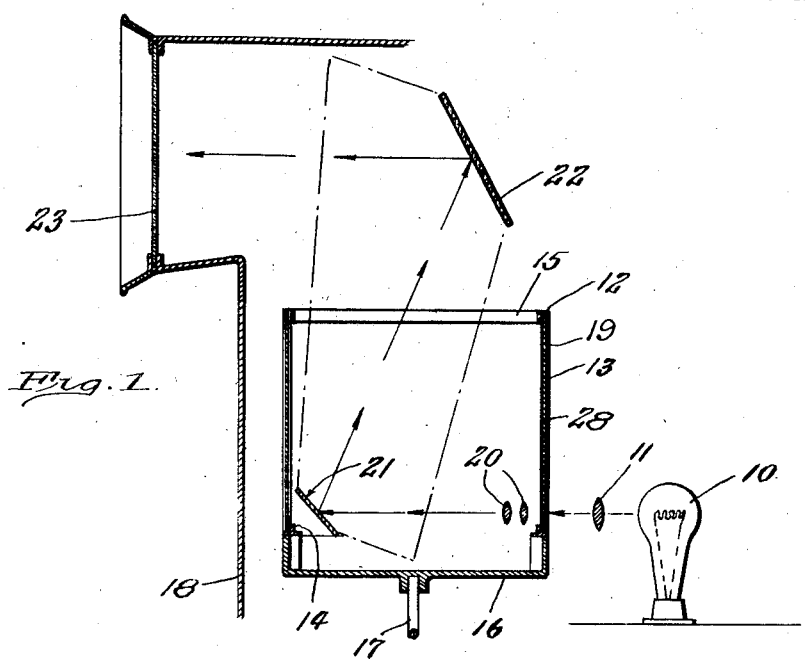
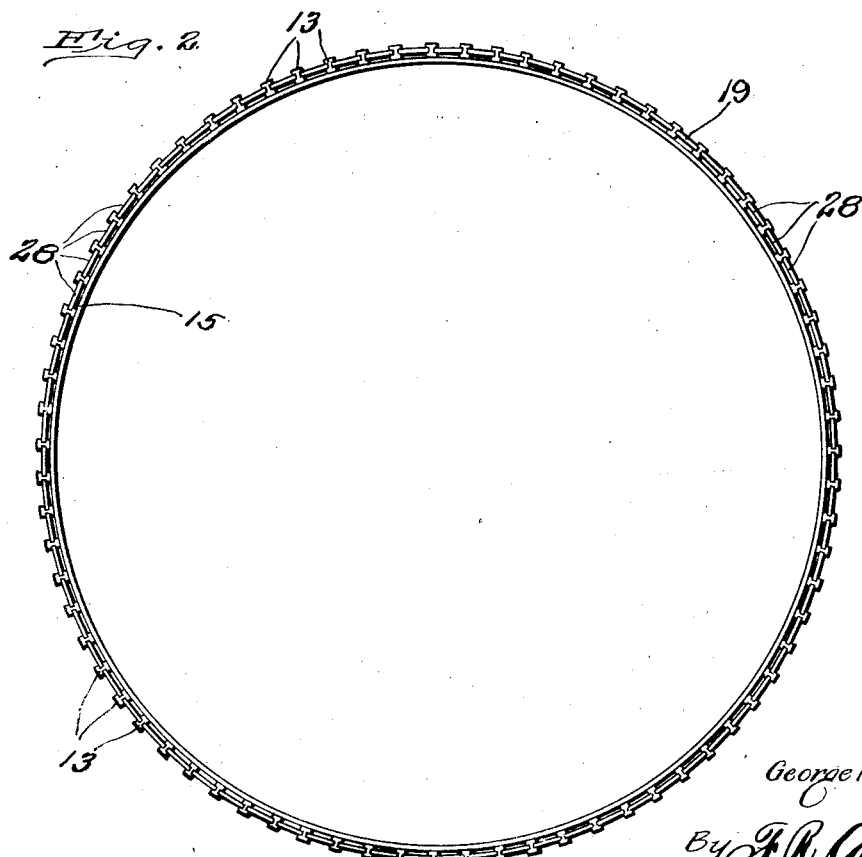
Inventor
George H. Kern.
By F. R. Cornwall
Att'y

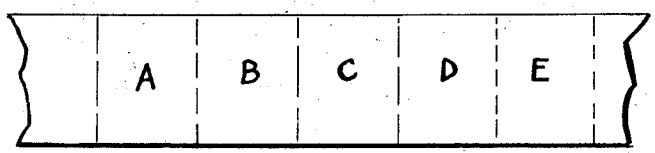
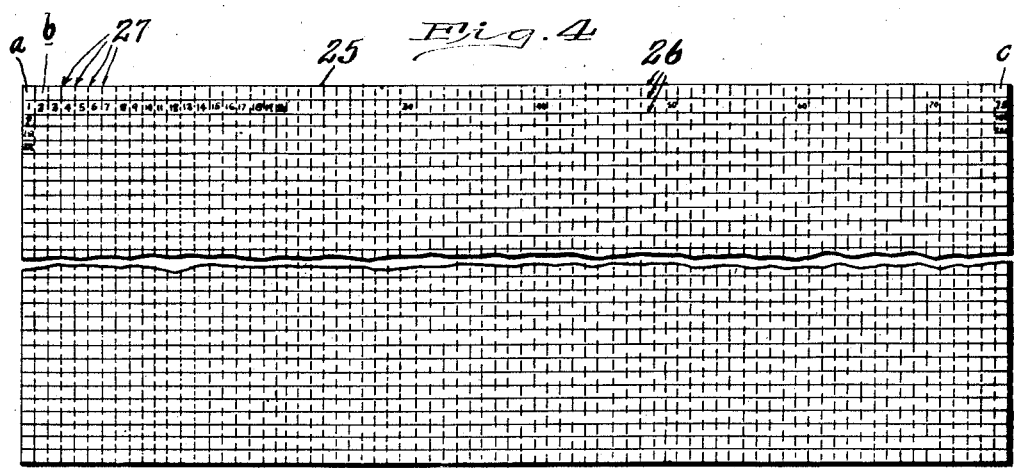
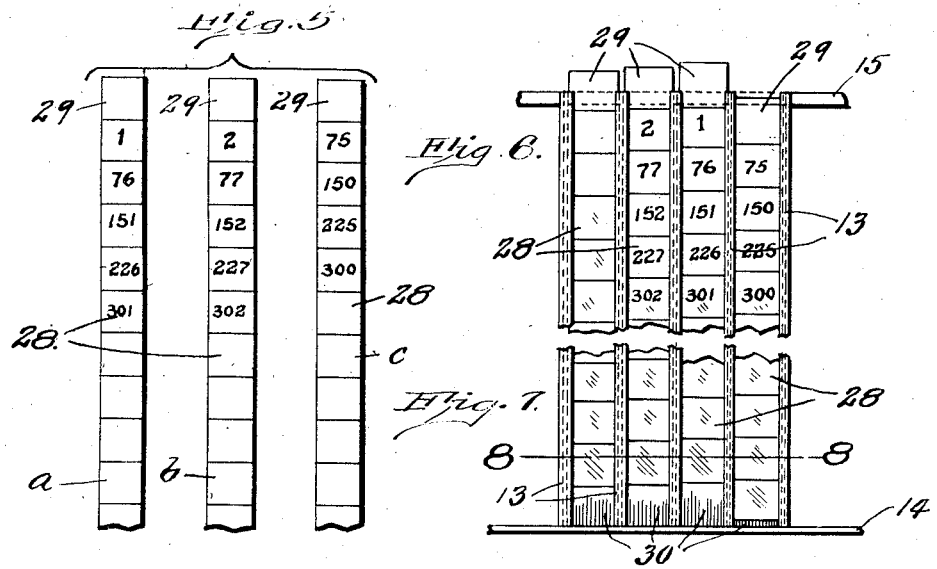
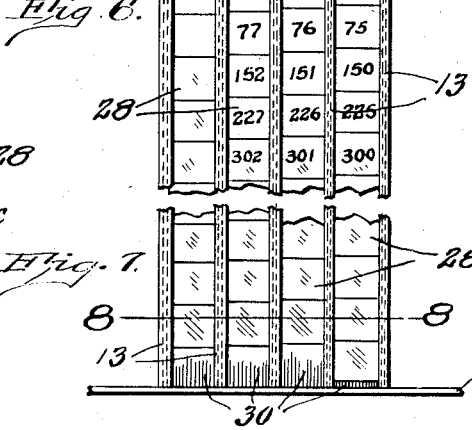
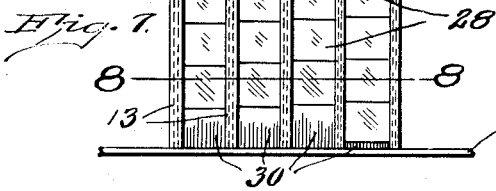
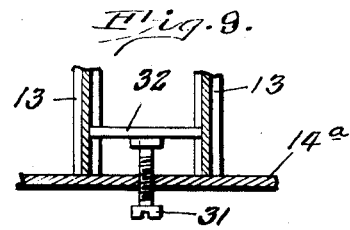

Patented Dec. 7, 1926.

1,609,949

UNITED STATES PATENT OFFICE.

GEORGE H. KERN, OF LOS ANGELES, CALIFORNIA, ASSIGNOR TO THE PRODUCERS PICTURES CORPORATION, OF ST. LOUIS, MISSOURI, A CORPORATION OF DELAWARE.

METHOD OF PRODUCING MOTION PICTURES.

Application filed October 19, 1921. Serial No. 508,863.

This invention relates to a new and useful method of producing motion pictures or positives and a holder therefor.

The objects of the invention are to produce pictures or positives which can be arranged circumferentially on a suitable holder whereby each picture or positive can be sequentially presented to the projecting means so that the entire surface of each picture or positive occupies a plane at right angles to said projecting means.

Further objects of the invention are to provide positives which can be economically manufactured and can be readily placed in their proper positions on the holder.

Still further objects of my invention are to provide a suitable holder or container adapted to receive said pictures and designed to be actuated so as to present each picture or positive in its proper projecting position.

With the foregoing and other objects in view, my invention consists in certain novel features hereinafter more fully described and claimed and illustrated in the accompanying drawings, in which—

Figure 1 shows the manner in which the pictures are projected onto a screen.

Figure 2 is a top plan view of the holder with the pictures in position therein.

Figure 3 is a fragmental view of a strip containing a series of positives or pictures utilized in projecting pictures for the holder.

Figure 4 is a plan view partly broken away of a plate on which the pictures or positives have been reproduced in a reduced form, said plate being ready to be cut into strips for positioning in the holder.

Figure 5 illustrates fragmental views of portions of the strips.

Figure 6 is a side elevational view, partly broken away, of the upper end of the holder.

Figure 7 is a side elevational view partly broken away of the lower end of the holder.

Figure 8 is a horizontal cross-section taken on line 8—8 of Figure 7.

Figure 9 is a detail sectional view of the lower end of the holder showing means for adjusting the strips in position.

Referring by numerals to the accompanying drawings, 10 indicates a source of light positioned in front of which is a condensing lens 11. This lens is positioned to one side of a holder 12, which latter is formed of a series of bars 13 held in spaced relation by base ring 14, to which the lower ends of said bars are secured, and top ring 15 which unites the upper ends of said bars. Base ring 14 is adapted to be detachably positioned on a turntable 16 which is carried in the upper end of shaft 17. This shaft 17 is journaled in housing 18 and is adapted to be actuated by any suitable mechanism (not shown) so as to intermittently revolve container 12 and feed it upwardly in synchronism with its rotary movement.

Bars 13 are preferably provided with longitudinal grooves in their sides in which are adapted to be slidably positioned strips of glass or other transparent material 19 containing pictures or positives which are to be projected.

Projecting lenses 20 are arranged in the inner side of container 12 and in alignment with a source of light 10 and condensing lens 11. The image of the picture projected forwardly by lenses 20 is received by reflecting member 21 which is spaced from said projecting lenses and angularly disposed so as to reflect the image against a reflecting member 22, angularly disposed above holder 12, and in co-operative relation with reflecting member 21.

A screen 23 of translucent material is located in the upper portion of housing 18 and in horizontal alignment with reflecting member 22. The image is reflected by member 22 and is projected in enlarged form against screen 23.

In order to form strips 19 in a practical and efficient manner, the original negatives are produced by having the camera tilted at a forty-five degree angle so that the pictures will be disposed horizontally on the celluloid strip at right angles to the line of travel thereof. Positive pictures are printed from these negatives on strips of convenient length,—in the present instance, strips containing seventy-five pictures each. A portion of one of said strips is illustrated in Figure 3 and the position of the pictures is indicated thereon by A, B, C, D and E. The strips are then secured to a plate in proper sequence reading from right to left and from top to bottom. This master plate is then reproduced in a reduced form on a transparent plate 25, in which the first horizontal row of pictures is represented by numerals 1 to 75; the second row 76 to 150; the third row, 151 to 225; and so on down the row, all of said rows containing the same number of pictures and all of said pictures being aligned in horizontal and vertical directions, as indicated by the horizontally disposed solid lines 26 and vertically disposed dotted lines 27. This plate is then cut along dotted lines 27 into vertical strips 19, as indicated 28 in Figure 5. The pictures will be horizontally disposed on the strips and will be in vertical alignment with each other but in point of sequence will be seventy-five exposures apart, or the number of strips into which plate 25 has been divided.

In Figure 5, strip $a$ will contain pictures Nos. 1, 76, 151, 226 and so on down. Strip $b$ will contain pictures Nos. 2, 77, 152, 227 and so on. Strip $c$, assuming this to be the last strip formed from plate 25, will contain pictures Nos. 75, 150, 225, 300, etc., reading downwardly. The upper end of each strip is left blank, as indicated at 29, in order to provide suitable clearance in positioning the strips in the holder 12.

Base ring 14 is provided with steps or spacers 30 which vary in height, the differences between any two spacers being equal (in the present instance) to one-seventy-fifth of the height of one picture, the spacer for the strip containing picture No. 1 being highest and the spacer containing picture No. 75 being lowest.

In placing the strips in position, and assuming that holder 12 is rotated anticlockwise, strip $b$ occupies a position to the right of strip $a$, and strip $c$ occupies a position to the left of strip $a$, as shown in Figures 6 and 7. Thus, it will be seen that picture No. 75 relatively occupies the same position to picture No. 76 as picture No. 1 occupies with respect to picture No. 2, each strip being offset with respect to its adjacent strips the proper distance by its corresponding spacer 30. In this manner, the entire series of pictures is arranged in a helical form on the container, and by moving holder 12 a proper distance upwardly every time a picture is positioned between lenses 11 and 2, the entire series of pictures will be projected in their proper sequence onto screen 23.

In Figure 9, a modified form is shown in which base ring 14$^a$ is provided with a series of screws 31 adjustably seated therein and centrally located between each pair of bars 13. The upper end of each screw 31 is provided with a plate 32 which forms a stop or rest for the lower end of a strip 28, when the latter is positioned therein. By turning screw 31, each strip can be adjusted to its proper position with respect to its adjacent strips.

By making the holder 12 in the form of a hollow drum which is open at its upper end, the projecting lenses 20 and reflecting member 21 can be accommodated within said holder as the same moves upwardly, thereby reducing the size of the motion picture, and by forming pictures with positives on transparent strips 28, pictures can be projected onto reflecting member 21 which occupies a position within holder 12 and each picture being formed on a flat surface will, when projected onto screen 23, be properly focused.

The pictures made according to my invention are designed to be accurately placed in position on the holder and the latter can be interchangeably used on a number of motion picture machines.

Obviously, various changes in the size and form of the strips and the holder can be made and substituted for those herein shown without departing from the spirit of my invention.

What I claim is:

1. A method of producing motion pictures consisting of arranging the pictures sequentially in horizontal and vertical rows on a plate, then dividing said plate into vertical strips in line with said vertical rows, and then placing said strips in their sequential relation in the circumference of a suitable support whereby the entire surface of each picture occupies a position at right angles to the line of projection.

2. A method of producing motion pictures consisting in arranging pictures on a transparent plate in their proper sequence in a series of horizontally disposed rows whereby the pictures of each series are in vertical alignment with the corresponding pictures of the remaining series, then cutting said plate into strips along the lines of the vertically aligned pictures, and then arranging said strips in their proper sequence circumferentially on a proper holder.

3. The herein described method of producing motion pictures consisting of arranging pictures sequentially in a series of rows, whereby said pictures will be aligned at right angles to said rows, then dividing said plate at right angles to said rows into strips containing said aligned pictures, and then arranging said strips circumferentially in a holder, whereby each strip is longitudinally offset with respect to its adjacent strips and the pictures are arranged sequentially in a helical form.

4. The herein described method of producing motion pictures consisting in arranging pictures sequentially in series of horizontally disposed rows whereby the pictures of each row are in vertical alignment with the pictures of the adjacent rows, then severing said plate vertically to form strips containing said vertically aligned pictures, and then arranging said strips in the periphery of a suitable holder whereby said pictures are arranged in their proper sequence in a helical form.

5. The herein described method of producing motion pictures consisting in transferring positives on a transparent plate in series of horizontal and vertical rows, the positives in each horizontal row being arranged in sequence and said horizontal rows being sequentially arranged with respect to each other, then cutting said plate into strips along said vertical rows, then arranging said strips in their proper sequence on a suitable holder whereby each strip is offset with respect to its adjacent strips so that all of said positives are sequentially arranged on the circumference of said holder.

In testimony whereof I hereunto affix my signature this 3rd day of October, 1921.

GEORGE H. KERN.